United States Patent
Lee et al.

(10) Patent No.: US 9,284,195 B2
(45) Date of Patent: Mar. 15, 2016

(54) AGGREGATED GRAPHENE OXIDE AND PREPARING METHOD THEREOF, AGGREGATED GRAPHENE AND PREPARING METHOD THEREOF, AND AGGREGATED AND NITROGEN-DOPED GRAPHENE AND PREPARING METHOD THEREOF

(71) Applicant: RESEARCH & BUSINESS FOUNDATION SUNGKYUNKWAN UNIVERSITY, Suwon-si (KR)

(72) Inventors: Hyoyoung Lee, Suwon-si (KR); Yeo Heung Yoon, Daejeon (KR); Chul Baik, Suwon-si (KR); Keun Sik Lee, Bucheon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/168,284

(22) Filed: Jan. 30, 2014

(65) Prior Publication Data
US 2014/0287908 A1 Sep. 25, 2014

(30) Foreign Application Priority Data
Jan. 30, 2013 (KR) .................. 10-2013-0010553
Jan. 24, 2014 (KR) .................. 10-2014-0008945

(51) Int. Cl.
*C01B 31/04* (2006.01)
(52) U.S. Cl.
CPC ........... *C01B 31/0446* (2013.01); *C01B 31/043* (2013.01); *C01B 2204/32* (2013.01); *Y10T 428/2982* (2015.01)

(58) Field of Classification Search
CPC  C01B 31/0446; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; Y10T 428/2982
USPC ......................................................... 423/448
See application file for complete search history.

(56) References Cited

U.S. PATENT DOCUMENTS

2010/0266964 A1* 10/2010 Gilje ............................. 430/322
2012/0034442 A1* 2/2012 Pauzauskie et al. .......... 428/219

OTHER PUBLICATIONS

Yoon, et al., Anti-Solvent Derived Non-Stacked Reduced Graphene Oxide for High Performance Supercapacitors, Adv. Mater. 2013; 25: 4437-4444.*

(Continued)

*Primary Examiner* — Daniel C McCracken
(74) *Attorney, Agent, or Firm* — NSIP Law (57) ABSTRACT

Aggregated graphene oxide includes a range of specific surface area, and a method of preparing aggregated graphene oxide includes dispersing graphene oxide in an organic solvent and adding an anti-solvent. Aggregated graphene includes a range of specific surface area, and a method of preparing aggregated graphene includes dispersing graphene oxide in an organic solvent, adding an anti-solvent, and reducing the aggregated graphene oxide. Aggregated and nitrogen-doped includes a range of specific surface area, and a method of preparing aggregated and nitrogen-doped graphene includes dispersing graphene oxide in an organic solvent, adding an anti-solvent, and photo-reacting the aggregated graphene oxide.

18 Claims, 8 Drawing Sheets

(56) References Cited

OTHER PUBLICATIONS

Ching-Yuan Su et al., "High-Quality Thin Graphene Films from Fast Electrochemical Exfoliation", ACS Nano. 2011, vol. 5, pp. 2332-2339, Feb. 10, 2011 (8 pages in English).

Zhenhai Wen et al., "Crumpled Nitrogen-Doped Graphene Nanosheets with Ultrahigh Pore Volume for High-Performance Supercapacitor", Advanced Materials, 2012, vol. 24, pp. 5610-5616, Aug. 14, 2012 (7 Pages in English).

* cited by examiner

AGGREGATED GRAPHENE OXIDE AND PREPARING METHOD THEREOF, AGGREGATED GRAPHENE AND PREPARING METHOD THEREOF, AND AGGREGATED AND NITROGEN-DOPED GRAPHENE AND PREPARING METHOD THEREOF

CROSS-REFERENCE TO RELATED APPLICATIONS

This application claims the benefit under 35 USC 119(a) of Korean Patent Application No. 10-2013-0010553 filed on Jan. 30, 2013 and Korean Patent Application No. 10-2014-0008945 filed on Jan. 24, 2014, in the Korean Intellectual Property Office, the entire disclosure of which are incorporated herein by reference for all purposes.

BACKGROUND

1. Field

The following description relates to aggregated graphene oxide and a preparing method thereof, aggregated graphene and a preparing method thereof, and aggregated and nitrogen-doped graphene and a preparing method thereof.

2. Description of Related Art

Graphene is generally a carbon structure of a two-dimensional nano-sheet monolayer, in which $sp^2$ carbon atoms form a hexagonal honeycomb lattice. Graphene was first discovered by the Novoselov's and Geim's research team in Britain in 2004 from graphite through mechanical exfoliation [Novoselov K et al., Electric field effect in atomically thin carbon films, *Science*, 306:666, 2004]. It is a material, which has been spotlighted as a groundbreaking new material by virtue of its significantly high specific surface area (theoretical value of 2,600 $m^2/g$), superior electronic conduction property, and physical (typical value of $8\times10^5$ S/cm from the view point of quantum mechanics) and chemical stability. Further, graphene has limitless applicability in energy storage materials (lithium ion secondary cells, hydrogen storage fuel cells, and super capacitors) for various devices upon nano-complexation with a transition metal, gas sensors, micro-components for medical engineering, high functional composites, and so on.

However, graphene is not easily exfoliated in a solution due to the van der Waals operation between graphene layers resulting from the bond of $sp^2$ carbons on a surface of the graphene. Accordingly, Graphene is mostly present as thick multilayer graphene rather than single layer graphene. Even if graphene is exfoliated, it tends to be restacked. Accordingly, there is a problem in that where a composite material is synthesized with transition metal oxide in a solution by using graphene as a precursor, it is difficult to utilize the high specific surface area of the monolayer graphene and form a uniformed composite structure. This problem impedes the utility of the transition metal oxide.

In order to overcome the problem, there has been suggested an activity treatment method using potassium hydroxide or carbon dioxide. For example, it was reported that while graphene, which has been subject to heat treatment through the activity treatment process using potassium hydroxide, exhibits a high specific surface area (3,100 $m^2/g$), the activity treatment affects the typical 2D structure of the graphene [Carbon-Based Supercapacitors Produced by Activation of Graphene, Yanwu Zhu et al., *Science* 332, 1537 (2011)]. Activity treatment using carbon dioxide is suitable for graphite, but graphene oxide is highly likely to be explored and completely oxidized during the activity treatment process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a method of preparing aggregated graphene oxide includes dispersing graphene oxide in an organic solvent; and adding an anti-solvent to the dispersed graphene oxide to form aggregated graphene oxide in the anti-solvent.

The organic solvent may be selected from the group consisting of ethanol, methanol, dichloromethane, dimethylformamide, and N-methyl pyrrolidone.

The anti-solvent may be selected from the group consisting of acetone, methanol, isopropylalcohol, pyridine, dichloromethane, xylan, petroleum ether, and hexane.

The method may further include filtering the aggregated graphene oxide in the anti-solvent after the formation of the aggregated graphene oxide.

Aggregated graphene oxide may be prepared according to the method and have a specific surface area of from about 700 $m^2/g$ to about 2,000 $m^2/g$.

In another aspect, a method of preparing aggregated graphene includes dispersing graphene oxide in an organic solvent; adding an anti-solvent to the dispersed graphene oxide to form aggregated graphene oxide in the anti-solvent; and reducing the aggregated graphene oxide in the anti-solvent.

The organic solvent may be selected from the group consisting of ethanol, methanol, dichloromethane, dimethylformamide, and N-methyl pyrrolidone.

The anti-solvent may be selected from the group consisting of acetone, methanol, isopropylalcohol, pyridine, dichloromethane, xylan, petroleum ether, and hexane.

The method may further include filtering the aggregated graphene oxide in the anti-solvent prior to the reducing the aggregated graphene oxide.

The reducing the aggregated graphene oxide may be carried out using heat treatment or a chemical reduction reaction.

Aggregated graphene may be prepared according to the method and have a specific surface area of from about 700 $m^2/g$ to about 2,000 $m^2/g$.

The aggregated graphene may include a pore having an average pore size of from about 1 nm to about 20 nm.

In another aspect, a method of preparing aggregated and nitrogen-doped graphene includes dispersing graphene oxide in an organic solvent; adding an anti-solvent to the dispersed graphene oxide to form aggregated graphene oxide in the anti-solvent; and photo-reacting the aggregated graphene oxide in the anti-solvent to prepare aggregated and nitrogen-doped graphene oxide in the anti-solvent.

The method may further include reducing the aggregated and nitrogen doped graphene oxide in the anti-solvent, and the photo-reacting may include photo-reacting the aggregated and nitrogen-doped graphene oxide in the anti-solvent using a cyanide-based compound.

The cyanide-based compound may be selected from the group consisting of cyanamide, dimethylcyanamide, diethylcyanamide, hydrogen cyanide, acetonitrile, propionitrile, butyronitrile, and valeronitrile.

The photo-reaction may be carried out by ultraviolet (UV) radiation.

The organic solvent may be selected from the group consisting of ethanol, methanol, dichloromethane, dimethylformamide, and N-methyl pyrrolidone.

The anti-solvent may be selected from the group consisting of acetone, methanol, isopropylalcohol, pyridine, dichloromethane, xylan, petroleumether, and hexan.

The method may further include filtering the aggregated graphene oxide in the anti-solvent prior to the reducing the aggregated and nitrogen doped graphene oxide.

The reducing the aggregated and nitrogen doped graphene oxide may be carried out using heat treatment or a chemical reduction reaction.

Aggregated and nitrogen-doped graphene may be prepared according to the method, nitrogen content may be from about 10 wt % to about 20 wt % to carbon content, and may have a specific surface area of from about 200 $m^2/g$ to about 900 $m^2/g$.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the whole of the present disclosure, the term "graphene" means that multiple carbon atoms are bonded to one another through covalent bond, thereby forming polycyclic aromatic molecules, and the carbon atoms bonded through the covalent bond form a six (6) circular ring as a basic repeat unit, but may further include five (5) and/or seven (7) circular rings. Accordingly, a sheet formed of the graphene appears to be a monolayer of the covalently bonded carbon atoms, but is not limited thereto. The sheet formed of the graphene may have various structures, and the structures may vary depending on a content of the 5 and/or 7 circular rings that may be contained in the graphene. A side end part of the graphene sheet may be saturated with hydrogen atoms, but is not limited thereto. Throughout the whole document, graphene may include graphene where graphene oxide undergoes a reducing process so that a proportion of oxygen is reduced.

Throughout the whole of the present disclosure, the terms "graphene oxide" may be abbreviated as "GO." The graphene oxide may include a structure in which a functional group containing oxygen such as a carboxyl group, a hydroxyl group, or an epoxy group is bonded on monolayer graphene, but is not limited thereto.

Throughout the whole of the present disclosure, the terms "aggregated" and "crumpled" have the same meaning as the word "non-stacked" and means the state that a sheet formed of graphene or graphene oxide is in the aggregated and crumpled state, and not the state that the sheet is tightly stacked on one another to form multiple layers. The aggregated graphene, the aggregated graphene oxide and the aggregated and nitrogen-doped graphene in accordance with the example embodiments have a higher specific surface area and a higher pore volume than those of graphene or graphene oxide in the stacked state.

Hereinafter, examples will be described but the present disclosure is not limited thereto.

In an example, a preparing method of aggregated graphene oxide includes dispersing graphene oxide in an organic solvent and adding an anti-solvent to the dispersed graphene oxide to form aggregated graphene oxide in the anti-solvent.

The graphene oxide prepared by the above-described example may be in the aggregated or crumpled state.

The organic solvent may include a member selected from the group consisting of ethanol, methanol, dichloromethane (MC), dimethylformamide (DMF) and N-methylpyrrolidone (NMP), but is not limited thereto. A graphene oxide dispersion solution may be prepared by dispersing the graphene oxide in the organic solvent. In this example, the organic solvent may have dispersibility with respect to the graphene oxide and include an organic solvent, and not water ($H_2O$).

The organic solvent may be used in an amount of approximately 2,000 mL or less based on approximately 1 g of the graphene oxide, but is not limited thereto. For example, approximately 1 g of the graphene oxide may be dispersed in from approximately 100 mL to approximately 2,000 mL of the organic solvent, but the present disclosure is not limited thereto.

For example, the anti-solvent may include a member selected from the group consisting of acetone, methanol, isopropylalcohol, pyridine, dichloromethane, xylan, petroleum ether and hexane, but is not limited thereto. The anti-solvent may include an organic solvent having significantly poor dispersibility with respect to the graphene oxide, but is not limited thereto. The methanol and the dichloromethane are included in solvents having dispersibility with respect to the graphene oxide, but may be used as the anti-solvent since their dispersibility is not good compared to other organic solvents. In this example, the graphene oxide is dispersed in the anti-solvent to disconnect hydrogen bonds formed in oxygen functional groups among graphene sheets and effectively remove water molecules. The graphene oxide, from which the water molecules are removed, is present in the anhydrous state in the anti-solvent.

The anti-solvent may be added in an amount ranging from approximately 2 parts by weight to approximately 20 parts by weight based on approximately 1 part by weight of the graphene oxide dispersion solution, but is not limited thereto. For example, the anti-solvent may be added in an amount of from approximately 2 parts by weight to approximately 20 parts by weight, from approximately 2 parts by weight to approximately 18 parts by weight, from approximately 2 parts by weight to approximately 15 parts by weight, from approximately 2 parts by weight to approximately 12 parts by weight, from approximately 2 parts by weight to approximately 10 parts by weight, from approximately 2 parts by weight to approximately 8 parts by weight, from approximately 2 parts by weight to approximately 5 parts by weight, from approximately 5 parts by weight to approximately 20 parts by weight, from approximately 8 parts by weight to approximately 20 parts by weight, from approximately 10 parts by weight to approximately 20 parts by weight, from approximately 12 parts by weight to approximately 20 parts by weight, from approximately 15 parts by weight to approximately 20 parts by weight, or from approximately 18 parts by weight to approximately 20 parts by weight, based on approximately 1 part by weight of the graphene oxide dispersion solution.

For example, filtering the aggregated or crumpled graphene oxide in the anti-solvent may be further included after the formation of the aggregated or crumpled graphene oxide, but is not limited thereto. The aggregated or crumpled graphene oxide in the anti-solvent may undergo the filtering process, which is carried out as a common method. In this example, the organic solvent having dispersibility can be completely removed by increasing the amount of the anti-solvent during the filtering process. Where the aggregated or crumpled graphene oxide in the anhydrous state in the anti-solvent undergoes the filtering process, aggregated graphene oxide having significantly high productivity and reproducibility can be prepared.

Figure 1:
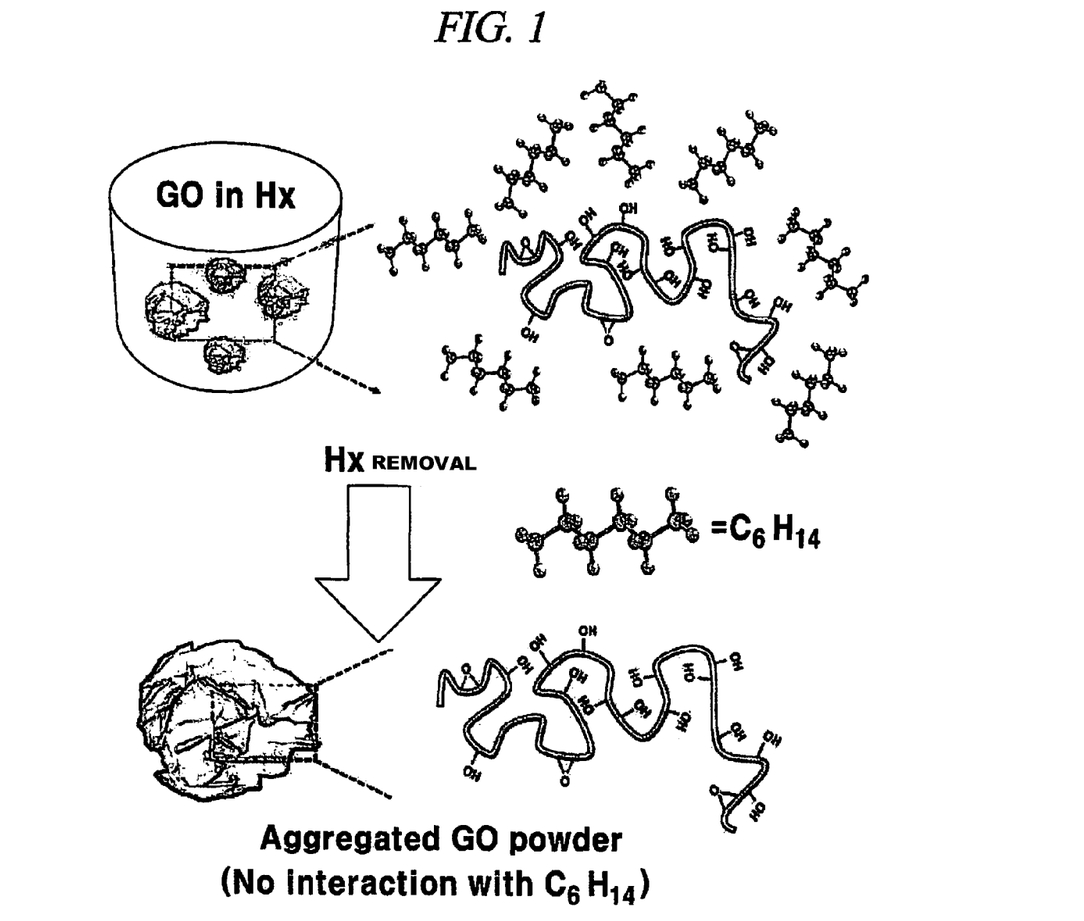
FIG. 1 is a diagram illustrating an example of a preparing process of aggregated graphene oxide.

FIG. 1 is a diagram illustrating an example of a preparing process of the aggregated or crumpled graphene oxide. As shown in FIG. 1, the aggregated or crumpled graphene oxide (GO) in the anhydrous state in the anti-solvent [e.g., hexane (Hx)] is in the aggregated or crumpled state, and the graphene oxide maintains the aggregated or crumpled state even in the state where the anti-solvent has been removed after the filtering process.

In another example, there is provided aggregated or crumpled graphene oxide, which is prepared according to the above-described preparing method and has a specific surface area of from approximately 700 $m^2/g$ to approximately 2,000 $m^2/g$.

For example, the specific surface area of the aggregated or crumpled graphene oxide may be from approximately 700 $m^2/g$ to approximately 2,000 $m^2/g$, from approximately 700 $m^2/g$ to approximately 1,900 $m^2/g$, from approximately 700 $m^2/g$ to approximately 1,700 $m^2/g$, from approximately 700 $m^2/g$ to approximately 1,500 $m^2/g$, from approximately 700 $m^2/g$ to approximately 1,300 $m^2/g$, from approximately 700 $m^2/g$ to approximately 1,100 $m^2/g$, from approximately 700 $m^2/g$ to approximately 900 $m^2/g$, from approximately 900 $m^2/g$ to approximately 2,000 $m^2/g$, from approximately 1,100 $m^2/g$ to approximately 2,000 $m^2/g$, from approximately 1,300 $m^2/g$ to approximately 2,000 $m^2/g$, from approximately 1,500 $m^2/g$ to approximately 2,000 $m^2/g$, from approximately 1,700 $m^2/g$ to approximately 2,000 $m^2/g$, or from approximately 1,900 $m^2/g$ to approximately 2,000 $m^2/g$, but is not limited thereto.

The aggregated or crumpled graphene oxide may include a pore having an average pore size of from approximately 1 nm to approximately 20 nm, but is not limited thereto. For example, the pore of the aggregated or crumpled graphene oxide may have an average pore size of from approximately 1 nm to approximately 20 nm, from approximately 1 nm to approximately 18 nm, from approximately 1 nm to approximately 15 nm, from approximately 1 nm to approximately 13 nm, from approximately 1 nm to approximately 10 nm, from approximately 1 nm to approximately 8 nm, from approximately 1 nm to approximately 5 nm, from approximately 1 nm to approximately 3 nm, from approximately 3 nm to approximately 20 nm, from approximately 5 nm to approximately 20 nm, from approximately 8 nm to approximately 20 nm, from approximately 10 nm to approximately 20 nm, from approximately 13 nm to approximately 20 nm, from approximately 15 nm to approximately 20 nm, or from approximately 18 nm to approximately 20 nm, but is not limited thereto.

In another example, a preparing method of aggregated or crumpled graphene includes dispersing graphene oxide in an organic solvent; adding an anti-solvent to the dispersed graphene oxide to form aggregated or crumpled graphene oxide in the anti-solvent; and reducing the aggregated or crumpled graphene oxide in the anti-solvent.

In this example, the organic solvent may include a member selected from the group consisting of ethanol, methanol, dichloromethane (MC), dimethylformamide (DMF) and N-methylpyrrolidone (NMP), but is not limited thereto. A graphene oxide dispersion solution may be prepared by dispersing the graphene oxide in the organic solvent, and in this case, the organic solvent may have porosity with respect to the graphene oxide and include an organic solvent, and not water ($H_2O$).

The organic solvent may be used in an amount of approximately 2,000 mL or less to approximately 1 g of the graphene oxide, but is not limited thereto. For example, approximately 1 g of the graphene oxide may be dispersed in from approximately 100 mL to approximately 2,000 mL of the organic solvent, but is not limited thereto.

The anti-solvent may include a member selected from the group consisting of acetone, methanol, isopropylalcohol, pyridine, dichloromethane, xylan, petroleumether and hexane, but is not limited thereto. The anti-solvent may include an organic solvent having significantly inferior dispersibility to the graphene oxide, but is not limited thereto. The methanol and the dichloromethane are included in solvents having dispersibility with respect to the graphene oxide, but may also be used as the anti-solvent since their dispersibility is not good compared to other organic solvents. In this example, the graphene oxide is dispersed in the anti-solvent to disconnect hydrogen bonds formed in an oxygen functional group among graphene sheets and effectively remove water molecules. The graphene oxide, from which water molecules are removed, are present in the anhydrous state in the anti-solvent.

The anti-solvent may be added in an amount of from approximately 2 parts by weight to approximately 20 parts by weight based on approximately 1 part by weight of the graphene oxide dispersion solution, but is not limited thereto. For example, the anti-solvent may be added in an amount of from approximately 2 parts by weight to approximately 20 parts by weight, from approximately 2 parts by weight to approximately 18 parts by weight, from approximately 2 parts by weight to approximately 15 parts by weight, from approximately 2 parts by weight to approximately 12 parts by weight, from approximately 2 parts by weight to approximately 10 parts by weight, from approximately 2 parts by weight to approximately 8 parts by weight, from approximately 2 parts by weight to approximately 5 parts by weight, from approximately 5 parts by weight to approximately 20 parts by weight, from approximately 8 parts by weight to approximately 20 parts by weight, from approximately 10 parts by weight to approximately 20 parts by weight, from approximately 12 parts by weight to approximately 20 parts by weight, from approximately 15 parts by weight to approximately 20 parts by weight, or from approximately 18 parts by weight to approximately 20 parts by weight, based on approximately 1 part by weight of the graphene oxide dispersion solution.

A process for filtering the aggregated or crumpled graphene oxide in the anti-solvent may be further included prior to the reducing process. For example, the aggregated or crumpled graphene oxide in the anti-solvent may be subject to the reducing process after undergoing the filtering process, which is carried out by a common method. In this example, the organic solvent having dispersibility may be completely removed by increasing the amount of the anti-solvent during the filtering process. Where the aggregated or crumpled graphene oxide in the anhydrous state in the anti-solvent is subject to the reducing process after undergoing the filtering process, aggregated or crumpled graphene having significantly high productivity and reproducibility can be prepared.

The reducing process may be carried out by heat treatment or chemical reduction reaction, but is not limited thereto.

A rate of the heat treatment may be approximately 20° C./minute or less, but is not limited thereto. For example, the rate of the heat treatment may be from approximately 1° C./minute to approximately 20° C./minute, from approximately 1° C./minute to approximately 18° C./minute, from approximately 1° C./minute to approximately 15° C./minute, from approximately 1° C. minute to approximately 12° C./minute, from approximately 1° C./minute to approximately 10° C./minute, from approximately 1° C./minute to approximately 8° C./minute, from approximately 1° C./minute to approximately 5° C./minute, from approximately 1° C./minute to approximately 3° C./minute, from approximately 3° C./minute to approximately 20° C./minute, from approximately 5° C./minute to approximately 20° C./minute, from approximately 8° C./minute to approximately 20° C./minute, from approximately 10° C./minute to approximately 20° C./minute, from approximately 12° C./minute to approximately 20° C./minute, from approximately 15° C./minute to approximately 20° C./minute, or from approximately 18° C./minute to approximately 20° C./minute, but is not limited thereto.

Since water molecules have been removed from the aggregated or crumpled graphene oxide in the anti-solvent, while the aggregated or crumpled graphene oxide is dispersed in the anti-solvent, the heat treatment can be implemented at a significantly low rate. Despite the heat treatment being implemented at such a low rate, the aggregated or crumpled graphene prepared by the reducing process can exhibit a significantly high specific surface.

In an example, a temperature for the heat treatment may be from approximately 150° C. to approximately 1,900° C., but is not limited thereto. For example, the temperature for the heat treatment may be slowly raised from the room temperature depending on the rate of the heat treatment; from approximately 150° C. to approximately 1,900° C., from approximately 150° C. to approximately 1,700° C., from approximately 150° C. to approximately 1,500° C., from approximately 150° C. to approximately 1,300° C., from approximately 150° C. to approximately 1,100° C., from approximately 150° C. to approximately 900° C., from approximately 150° C. to approximately 700° C., from approximately 150° C. to approximately 500° C., from approximately 150° C. to approximately 300° C., from approximately 150° C. to approximately 250° C., from approximately 150° C. to approximately 200° C., from approximately 150° C. to approximately 180° C., from approximately 180° C. to approximately 1,900° C., from approximately 200° C. to approximately 1,900° C., from approximately 250° C. to approximately 1,900° C., from approximately 300° C. to approximately 1,900° C., from approximately 500° C. to approximately 1,900° C., from approximately 700° C. to approximately 1,900° C., from approximately 900° C. to approximately 1,900° C., from approximately 1,100° C. to approximately 1,900° C., from approximately 1,300° C. to approximately 1,900° C., from approximately 1,500° C. to approximately 1,900° C., or from approximately 1,700° C. to approximately 1,900° C., but may not be limited thereto.

The heat treatment process may be implemented to reduce the graphene oxide, but is not limited thereto. The heat treatment process may be implemented for the graphene oxide in the anhydrous state, which has undergone the common filtering process, or the graphene oxide in the state of the solution aggregated in the anti-solvent, which has not undergone the filtering.

The aggregated or crumpled graphene oxide in the anti-solvent may be subject to the reducing process in the solution state without undergoing an additional filtering process so that aggregated or crumpled graphene can be prepared. The porous graphene that has been prepared in the solution state without undergoing an additional filtering process may also retain a high specific surface area. For example, the reducing process, which is implemented in the solution state without the filtering process, may be a chemical reduction reaction carried out by an iodic acid or hydrazine, but is not limited thereto.

In another example, aggregated or crumpled graphene may be prepared according to the above-described preparing method and have a specific surface area ranging from approximately 700 $m^2/g$ to approximately 2,000 $m^2/g$.

For example, the specific surface area of the aggregated or crumpled graphene may be from approximately 700 $m^2/g$ to approximately 2,000 $m^2/g$, from approximately 700 $m^2/g$ to approximately 1,900 $m^2/g$, from approximately 700 $m^2/g$ to approximately 1,700 $m^2/g$, from approximately 700 $m^2/g$ to approximately 1,500 $m^2/g$, from approximately 700 $m^2/g$ to approximately 1,300 $m^2/g$, from approximately 700 $m^2/g$ to approximately 1,100 $m^2/g$, from approximately 700 $m^2/g$ to approximately 900 $m^2/g$, from approximately 900 $m^2/g$ to approximately 2,000 $m^2/g$, from approximately 1,100 $m^2/g$ to approximately 2,000 $m^2/g$, from approximately 1,300 $m^2/g$ to approximately 2,000 $m^2/g$, from approximately 1,500 $m^2/g$ to approximately 2,000 $m^2/g$, from approximately 1,700 $m^2/g$ to approximately 2,000 m²/g, or from approximately 1,900 m²/g to approximately 2,000 m²/g, but is not limited thereto.

The aggregated or crumpled graphene may include a pore having an average pore size of from approximately 1 nm to approximately 20 nm, but is not limited thereto. For example, the pore of the aggregated or crumpled graphene in accordance with the example embodiment of the present disclosure may have an average pore size of from approximately 1 nm to approximately 20 nm, from approximately 1 nm to approximately 18 nm, from approximately 1 nm to approximately 15 nm, from approximately 1 nm to approximately 13 nm, from approximately 1 nm to approximately 10 nm, from approximately 1 nm to approximately 8 nm, from approximately 1 nm to approximately 5 nm, from approximately 1 nm to approximately 3 nm, from approximately 3 nm to approximately 20 nm, from approximately 5 nm to approximately 20 nm, from approximately 8 nm to approximately 20 nm, from approximately 10 nm to approximately 20 nm, from approximately 13 nm to approximately 20 nm, from approximately 15 nm to approximately 20 nm, or from approximately 18 nm to approximately 20 nm, but is not limited thereto.

In another example, a method of preparing aggregated or crumpled and nitrogen-doped graphene includes dispersing graphene oxide in an organic solvent; adding an anti-solvent to the dispersed graphene oxide to form aggregated or crumpled graphene oxide in the anti-solvent; photo-reacting the aggregated or crumpled graphene oxide in the anti-solvent with a cyanide-based compound to prepare aggregated or crumpled and nitrogen-doped graphene oxide in the anti-solvent; and reducing the aggregated or crumpled and nitrogen-doped graphene oxide in the anti-solvent.

In this example, the organic solvent may include a member selected from the group consisting of ethanol, methanol, dichloromethane (MC), dimethylformamide (DMF) and N-methylpyrrolidone (NMP), but is not limited thereto. A graphene oxide dispersion solution is prepared by dispersing the graphene oxide in the organic solvent. In this case, the organic solvent may have dispersibility with respect to the graphene oxide and include an organic solvent, and not water ($H_2O$).

The organic solvent may be used in an amount of approximately 2,000 mL or less based on approximately 1 g of the graphene oxide, but is not limited thereto. For example, approximately 1 g of the graphene oxide may be dispersed in from approximately 100 mL to approximately 2,000 mL of the organic solvent, but is not limited thereto.

The anti-solvent may include a member selected from the group consisting of acetone, methanol, isopropylalcohol, pyridine, dichloromethane, xylan, petroleumether and hexane, but is not limited thereto. The methanol and the dichloromethane are included in solvents having dispersibility with respect to the graphene oxide, but may also be used as the anti-solvent since their dispersibility is not good compared to other organic solvents. In this example, the graphene oxide is dispersed in the anti-solvent to disconnect hydrogen bonds formed in oxygen functional groups among graphene sheets and effectively remove water molecules. The graphene oxide, from which water molecules are removed, are present in the anhydrous state in the anti-solvent.

The anti-solvent may be added in an amount of from approximately 2 parts by weight to approximately 20 parts by weight based on approximately 1 part by weight of the graphene oxide dispersion solution, but is not limited thereto. For example, the anti-solvent may be added in an amount of from approximately 2 parts by weight to approximately 20 parts by weight, from approximately 2 parts by weight to approximately 18 parts by weight, from approximately 2 parts by weight to approximately 15 parts by weight, from approximately 2 parts by weight to approximately 12 parts by weight, from approximately 2 parts by weight to approximately 10 parts by weight, from approximately 2 parts by weight to approximately 8 parts by weight, from approximately 2 parts by weight to approximately 5 parts by weight, from approximately 5 parts by weight to approximately 20 parts by weight, from approximately 8 parts by weight to approximately 20 parts by weight, from approximately 10 parts by weight to approximately 20 parts by weight, from approximately 12 parts by weight to approximately 20 parts by weight, from approximately 15 parts by weight to approximately 20 parts by weight, or from approximately 18 parts by weight to approximately 20 parts by weight, based on approximately 1 part by weight of the graphene oxide dispersion solution, but is not limited thereto.

The cyanide-based compound may include a member selected from the group consisting of cyanamide, dimethylcyanamide, diethylcyanamide, hydrogen cyanide, acetonitrile, propionitrile, butyronitrile and valeronitrile, but is not limited thereto.

For example, the photo-reaction may be carried out by ultraviolet (UV) radiation, but is not limited thereto. By inducing chemical bonds through photo-reaction with the cyanide-based compound, the aggregated or crumpled, nitrogen-doped graphene oxide in the anti-solvent can be obtained. In a conventional method for preparing nitrogen-doped porous graphene through physical bond, doping efficiency is low (from 1 wt % to 5 wt %), and a value of the specific surface area is small due to influence of a nitrogen source used. To the contrary, in the preparing method of this example, the aggregated or crumpled and nitrogen-doped graphene, which has high nitrogen atom doping efficiency and a high specific surface area, can be obtained by inducing chemical bonds, and not physical bonds, through photo-reaction with the cyanide-based compound.

In an example, filtering the aggregated or crumpled graphene oxide in the anti-solvent may be further included prior to the reducing process. The aggregated or crumpled, nitrogen-doped graphene oxide in the anti-solvent may be subject to the reducing process after undergoing the filtering process which is carried out by a common method, but is not limited thereto. In this example, the organic solvent having dispersibility can be completely removed by increasing the amount of the anti-solvent during the filtering process. Where the aggregated or crumpled, nitrogen-doped graphene oxide in the anhydrous state in the anti-solvent is subject to the reducing process after undergoing the filtering process, graphene oxide having significantly high productivity and reproducibility can be prepared.

The reducing process may be carried out by heat treatment or chemical reduction reaction, but is not limited thereto.

For example, a rate of the heat treatment may be approximately 20° C./minute or less, but is not limited thereto. For example, the rate of the heat treatment may be from approximately 1° C./minute to approximately 20° C./minute, from approximately 1° C./minute to approximately 18° C./minute, from approximately 1° C./minute to approximately 15° C./minute, from approximately 1° C./minute to approximately 12° C./minute, from approximately 1° C./minute to approximately 10° C./minute, from approximately 1° C./minute to approximately 8° C./minute, from approximately 1° C./minute to approximately 5° C./minute, from approximately 1° C./minute to approximately 3° C./minute, from approximately 3° C./minute to approximately 20° C./minute, from approximately 5° C./minute to approximately 20° C./minute, from approximately 8° C./minute to approximately 20° C./minute, from approximately 10° C./minute to approximately 20° C./minute, from approximately 12° C./minute to approximately 20° C./minute, from approximately 15° C./minute to approximately 20° C./minute, or from approximately 18° C./minute to approximately 20° C./minute. Since water molecules have been removed from the aggregated or crumpled, nitrogen-doped graphene oxide in the anti-solvent, while the graphene oxide is dispersed in the anti-solvent, the heat treatment may be implemented at a significantly low rate. Despite that the heat treatment being implemented at such a low rate, the graphene can exhibit a significantly high specific surface area.

A temperature for the heat treatment may be approximately 600° C. to approximately 1,100° C., but is not limited thereto. For example, the temperature for the heat treatment may be slowly raised from the room temperature depending on the rate of the heat treatment. For example, the temperature may be raised from approximately 600° C. to approximately 1,100° C., from approximately 600° C. to approximately 1,000° C., from approximately 600° C. to approximately 900° C., from approximately 600° C. to approximately 800° C., from approximately 600° C. to approximately 700° C., from approximately 700° C. to approximately 1,100° C., from approximately 800° C. to approximately 1,100° C., from approximately 900° C. to approximately 1,100° C., or from approximately 1,000° C. to approximately 1,100° C., but is not limited thereto. In this case, when the temperature for the heat treatment exceeds approximately 1,100° C., high nitrogen doping efficiency may not be retained.

The heat treatment process may be implemented to reduce the nitrogen-doped graphene oxide, but is not limited thereto. The heat treatment process may be implemented for the nitrogen-doped graphene oxide in the anhydrous state, which has undergone a common filtering process, or the aggregated or crumpled, nitrogen-doped graphene oxide in the state of the solution aggregated in the anti-solvent, which has not undergone the filtering.

For example, the aggregated or crumpled, nitrogen-doped graphene oxide in the anti-solvent may be subject to the reducing process in the solution processing without undergoing an additional filtering process so as to prepare the graphene. The reducing process, which is implemented in the solution state without the filtering process, may be a chemical reduction reaction, which is carried out using an iodic acid or hydrazine, but is not limited thereto.

In another example, aggregated or crumpled and nitrogen-doped graphene may be prepared according to the above-described method, in which a nitrogen content is from approximately 10 wt % to approximately 20 wt % to carbons, and which has a specific surface area of from approximately 200 $m^2/g$ to approximately 900 $m^2/g$.

For example, the nitrogen content of the aggregated or crumpled, nitrogen-doped graphene to carbons in this example may be from approximately 10 wt % to approximately 20 wt %, from approximately 10 wt % to approximately 18 wt %, from approximately 10 wt % to approximately 16 wt %, from approximately 10 wt % to approximately 14 wt %, from approximately 10 wt % to approximately 12 wt %, from approximately 12 wt % to approximately 20 wt %, from approximately 14 wt % to approximately 20 wt %, from approximately 16 wt % to approximately 20 wt % or from approximately 18 wt % to approximately 20 wt %, but is not limited thereto. For example, the specific surface area of the aggregated crumpled, nitrogen-doped graphene of this example may be from approximately 200 $m^2/g$ to approximately 900 $m^2/g$, from approximately 200 $m^2/g$ to approximately 800 $m^2/g$, from approximately 200 $m^2/g$ to approximately 700 $m^2/g$, from approximately 200 $m^2/g$ to approximately 500 $m^2/g$, from approximately 200 $m^2/g$ to approximately 300 $m^2/g$, from approximately 300 $m^2/g$ to approximately 900 $m^2/g$, from approximately 500 $m^2/g$ to approximately 900 $m^2/g$, from approximately 700 $m^2/g$ to approximately 900 $m^2/g$, or from approximately 800 $m^2/g$ to approximately 900 $m^2/g$, but is not limited thereto.

The aggregated or crumpled, nitrogen-doped graphene may include a pore having an average pore size ranging from approximately 1 nm to approximately 100 nm, but is not limited thereto. For example, the pore of the aggregated or crumpled and nitrogen-doped graphene may have an average pore size of from approximately 1 nm to approximately 100 nm, from approximately 1 nm to approximately 80 nm, from approximately 1 nm to approximately 60 nm, from approximately 1 nm to approximately 40 nm, from approximately 1 nm to approximately 20 nm, from approximately 1 nm to approximately 15 nm, from approximately 1 nm to approximately 10 nm, from approximately 1 nm to approximately 8 nm, from approximately 1 nm to approximately 5 nm, from approximately 5 nm to approximately 100 nm, from approximately 8 nm to approximately 100 nm, from approximately 10 nm to approximately 100 nm, from approximately 15 nm to approximately 100 nm, from approximately 20 nm to approximately 100 nm, from approximately 40 nm to approximately 100 nm, from approximately 60 nm to approximately 100 nm, or from approximately 80 nm to approximately 100 nm, but is not limited thereto.

Since the aggregated or crumpled graphene, the aggregated or crumpled graphene oxide, and the aggregated or crumpled, nitrogen-doped graphene in accordance with these examples have superior specific surface area and pore volume compared to graphene or graphene oxide in the stacked state, which has been conventionally used, they can be utilized in industrial fields such as lithium secondary cells, fuel cells, catalysts, absorbents, separation films and energy conversion systems.

Hereinafter, examples are provided but the present disclosure is not limited to these examples.

EXAMPLES

Preparation Example

Preparation of the Graphene Oxide

The graphene oxide was prepared by processing pure graphite powders with sulfuric acid, potassium permanganate, and sodium nitrate, and performing the methods of Hummers and Offenman.

Example 1

Preparation of the Aggregated or Crumpled Graphene Oxide in a Solution

The graphene oxide (1 g) obtained in the above Preparation Example was injected into and dispersed in a mixture solution of ethanol (330 mL) and dichloromethane (110 mL). Hexane (1 L) was added to the graphene oxide dispersed in the ethanol so that the aggregated or crumpled graphene oxide was obtained.

Example 2

Preparation of the Aggregated or Crumpled Graphene Oxide Through Filtering

The graphene oxide (1 g) obtained in the above Preparation Example was injected into and dispersed in a mixture solution of ethanol (330 mL) and dichloromethane (110 mL). Hexane (1 L) was added to the graphene oxide dispersed in the ethanol. Hexane was further added to the graphene oxide dispersed in the anti-solvent, and the graphene oxide was filtered by using a polytetrafluoroethylene (PTFE) resin filter having a pore size of 200 nm. Accordingly, the aggregated or crumpled graphene oxide in the anhydrous state was obtained.

Example 3

Preparation of the Aggregated or Crumpled Graphene in a Solution

The graphene oxide (1 g) obtained in the above Preparation Example was injected into and dispersed in a mixture solution of ethanol (330 mL) and dichloromethane (110 mL). Hexane (1 L) was added to the graphene oxide dispersed in the ethanol. The graphene oxide dispersed in the anti-solvent was subject to heat treatment by raising the temperature from room temperature to 1,000° C. at a rate of 1° C./minute. The aggregated or crumpled graphene was obtained after the heat treatment (40%), and FIG. 2 illustrates an example of an SEM image of the obtained aggregated or crumpled graphene.

Figure 2:
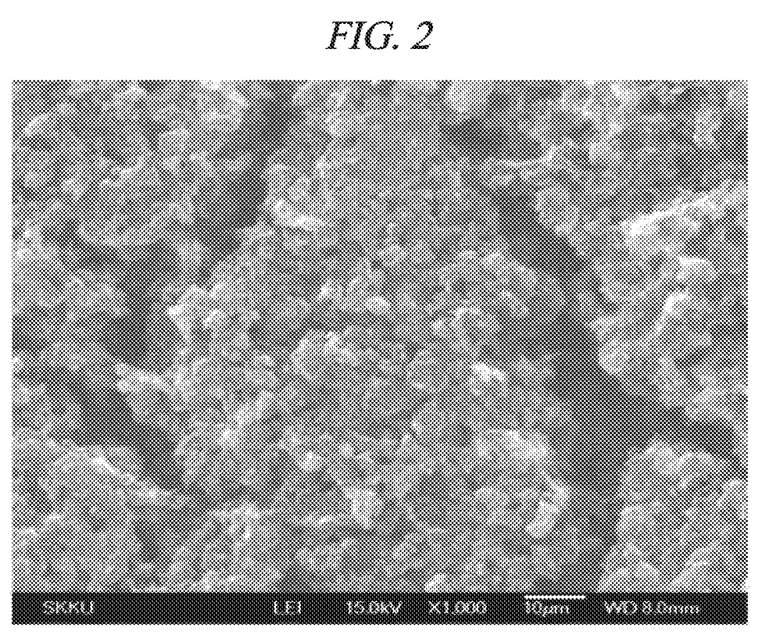
FIG. 2 is a diagram illustrating an example of a scanning electron microscope (SEM) image of aggregated graphene which has been subject to a reducing process in a solvent.

FIG. 2 is a diagram illustrating an example of a scanning electron microscope (SEM) image of the graphene, which has been subject to the reducing process in the solvent in accordance with the present example. As shown in FIG. 2, it was identified that the aggregated or crumpled graphene was prepared.

Example 4

Preparation of the Aggregated or Crumpled Graphene Through Filtering

The graphene oxide (1 g) obtained in the above Preparation Example was injected into and dispersed in a mixture solution of ethanol (330 mL) and dichloromethane (110 mL). Hexane (1 L) was added to the graphene oxide dispersed in the ethanol. The anti-solvent was added to the graphene oxide dispersed in the anti-solvent, and the graphene oxide was filtered by using a polytetrafluoroethylene (PTFE) resin filter having a pore size of 200 nm. Accordingly, the aggregated or crumpled graphene oxide in the anhydrous state was obtained.

The obtained graphene oxide in the anhydrous state was subject to heat treatment by raising a temperature from the room temperature to 1,000° C. at a rate of 1° C./minute. The aggregated or crumpled graphene was obtained after the heat treatment (400 mg, 40%), and FIGS. 3 and 4 illustrate examples of images of the obtained aggregated or crumpled graphene.

Figure 3:
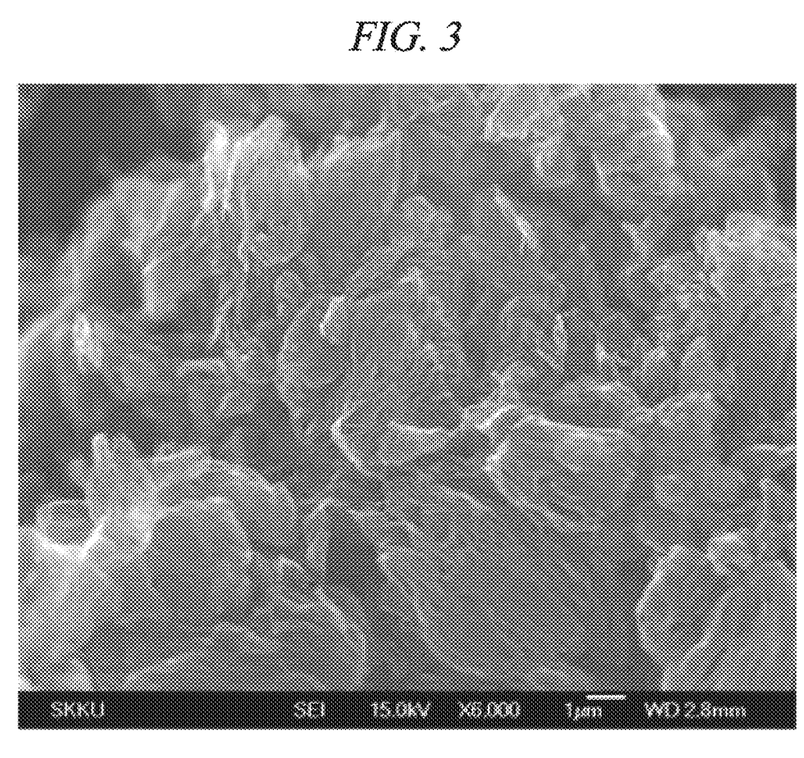
FIG. 3 is a diagram illustrating an example of an SEM image of aggregated graphene which has been subject to heat treatment after filtration.
Figure 4:
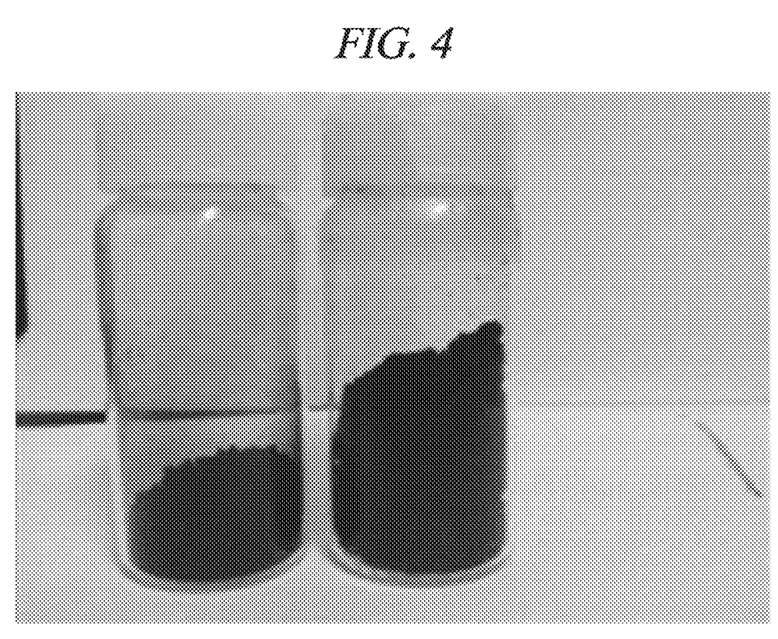
FIG. 4 is a diagram illustrating an example of a photograph showing the state of aggregated graphene.

FIG. 3 is a diagram illustrating an example of a scanning electron microscope (SEM) image of the aggregated or crumpled graphene, which has been subject to the heat treatment after filtering in accordance with the present example, and FIG. 4 is a diagram illustrating an example of a photograph showing the state of the aggregated or crumpled graphene. As shown in FIG. 3, it was identified that the aggregated or crumpled graphene was prepared.

Example 5

Preparation of the Aggregated or Crumpled and Nitrogen-Doped Graphene in a Solution The graphene oxide (1 g) obtained in the above Preparation Example was injected into and dispersed in a mixture solution of ethanol (330 mL) and dichloromethane (110 mL). Hexane (1 L) was added to the graphene oxide dispersed in the ethanol. Cyanamide (1 g) was added to the graphene oxide dispersed in the anti-solvent, and the graphene oxide was subject to photo-reaction by irradiating UV radiation (300 nm, 50 W) for 40 minutes. After photo-reaction was completed, the aggregated or crumpled and nitrogen-doped graphene oxide was independently subject to heat treatment by raising the temperature from room temperature to 600° C., 800° C., and 1,000° C. at a rate of 1° C./minute. The aggregated or crumpled and nitrogen-doped graphene was obtained after the heat treatment (450 mg, 45%).

Example 6

Preparation of the Aggregated or Crumpled and Nitrogen-Doped Graphene Through Filtering The graphene oxide (1 g) obtained in the above Preparation Example was injected into and dispersed in a mixture solution of ethanol (330 mL) and dichloromethane (110 mL). Hexane (1 L) was added to the graphene oxide dispersed in the ethanol. Cyanamide (1 g) was added to the graphene oxide dispersed in the anti-solvent, and the graphene oxide was subject to photo-reaction by irradiating UV radiation (300 nm, 50 W) for 40 minutes. After photo-reaction was completed, the anti-solvent was added to the aggregated or crumpled and nitrogen-doped graphene oxide, and the aggregated or crumpled and nitrogen-doped graphene oxide was filtered by using a polytetrafluoroethylene (PTFE) resin filter having a pore size of 200 nm. Accordingly, the aggregated or crumpled, nitrogen-doped graphene oxide in the anhydrous state was obtained.

The obtained aggregated or crumpled, nitrogen-doped graphene oxide in the anhydrous state was independently subject to heat treatment by raising a temperature from the room temperature to 600° C., 800° C. and 1,000° C. at a rate of 1° C./minute. The aggregated or crumpled, nitrogen-doped graphene was obtained after the heat treatment (450 mg, 45%), and FIGS. 5 and 6 illustrate examples of the analysis results.

Figure 5:
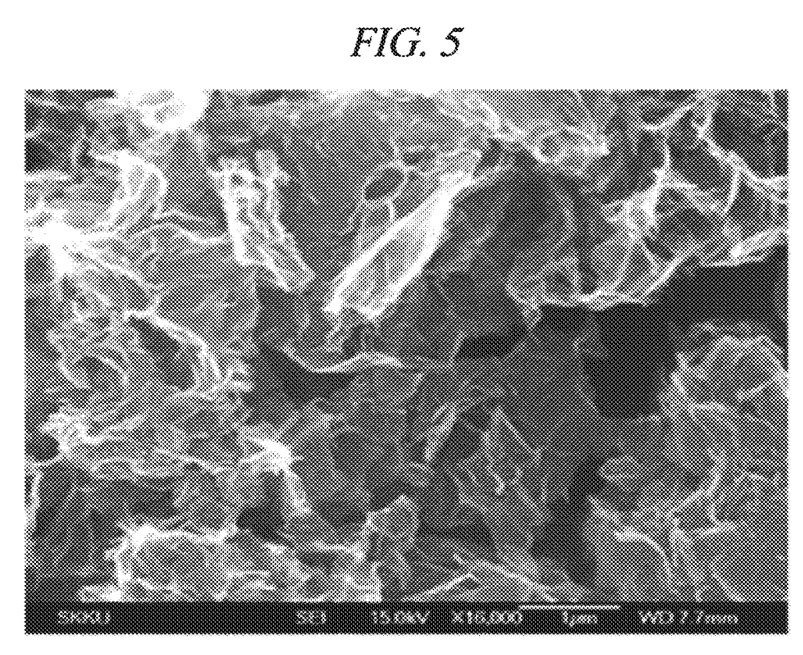
FIG. 5 is a diagram illustrating an example of an SEM image of aggregated and nitrogen-doped graphene.
Figure 6:
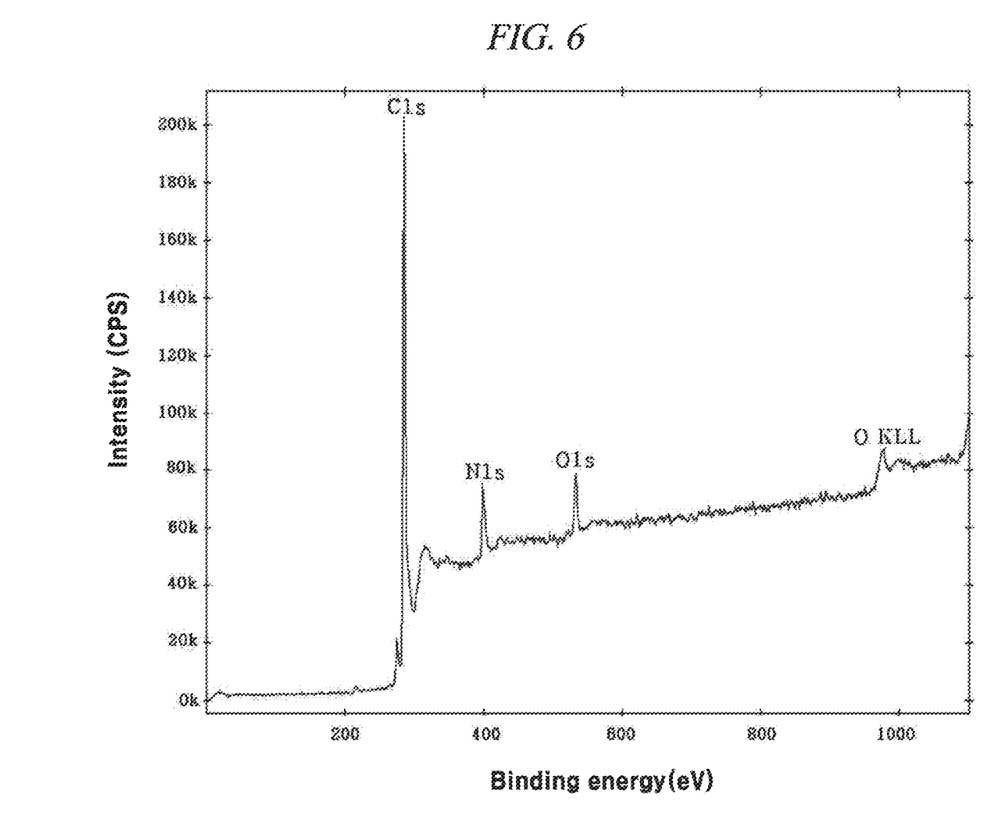
FIG. 6 is a diagram illustrating an example of a graph obtained from X-ray photoelectron spectroscopy (XPS) measurement of aggregated and nitrogen-doped graphene.

FIG. 5 is a diagram illustrating an example of a scanning electron microscope (SEM) image of the aggregated or crumpled and nitrogen-doped graphene, and FIG. 6 is a diagram illustrating an example of a graph obtained from X-ray photoelectron spectroscopy (XPS) measurement of the aggregated or crumpled, nitrogen-doped graphene. As shown in FIG. 5, it was identified that the aggregated or crumpled, nitrogen-doped graphene was prepared. As shown in FIG. 6, an N 1s XPS peak was observed at approximately 400 eV together with a C 1s XPS peak at 284.8 eV. Accordingly, it was identified that the aggregated or crumpled, nitrogen-doped graphene formed covalent bond with nitrogen, and it was also identified that a concentration of the nitrogen doped on the aggregated or crumpled, nitrogen-doped graphene was approximately 12 wt %, which corresponds to high doping efficiency.

Experimental Example 1

Analysis of Characteristics of the Prepared Aggregated or Crumpled Graphene

Characteristic analysis experiments for the aggregated or crumpled graphene and the aggregated or crumpled, nitrogen-doped graphene, which were obtained in Examples 3 to 6, were conducted. The structures of the aggregated or crumpled graphene and the aggregated or crumpled, nitrogen-doped graphene, which were obtained in Examples 3 to 6, were studied using a scanning electron microscope (FE-SEM 7600F, JEOL) and X-ray photoelectron spectroscopy (XPS). All XPS measurements were performed at 100 W by SIGMA PROBE (ThermoVG, Britain) using a solid-color Al-Kα X-ray source. Further, the specific surface areas and the pore structures of the aggregated or crumpled graphene and the aggregated or crumpled, nitrogen-doped graphene were studied by measuring $N_2$ adsorption-desorption isotherms (refer to FIG. 7 and FIG. 8) at a liquid nitrogen temperature by using BELSORP-mini II (BEL Japan Inc.) to obtain volumes, and Table 1 below shows example results.

Figure 7:
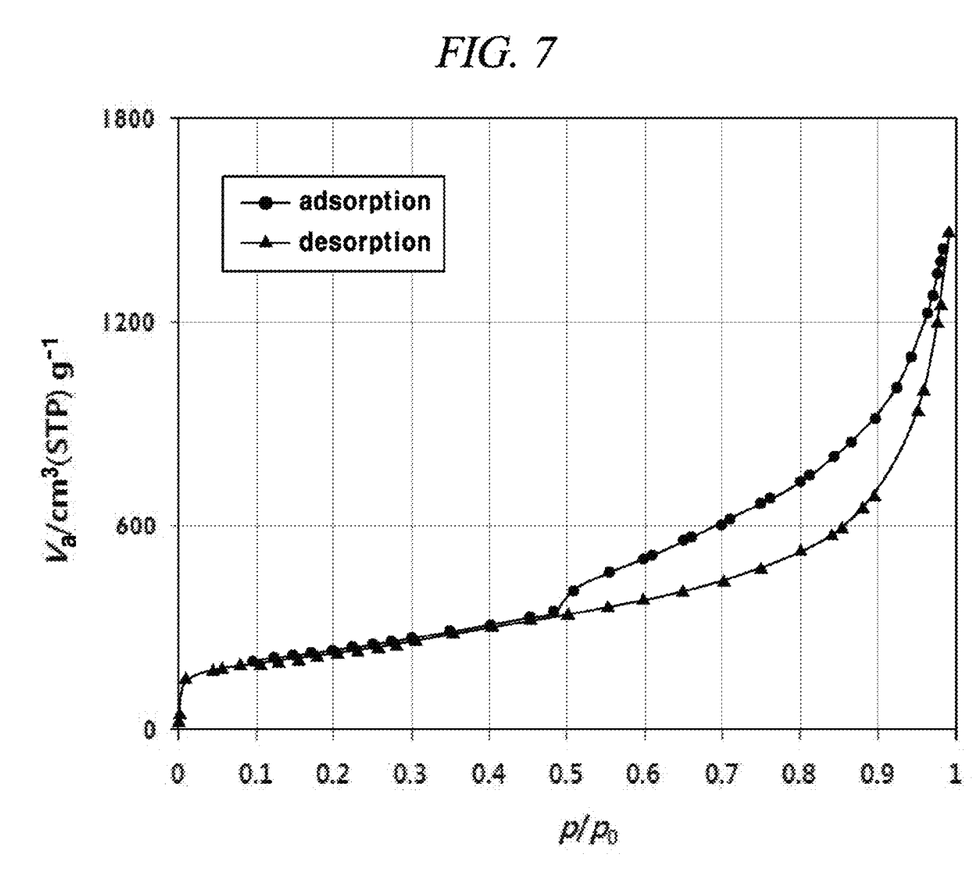
FIG. 7 is a diagram illustrating an example of adsorption/desorption isotherms of aggregated graphene.
Figure 8:
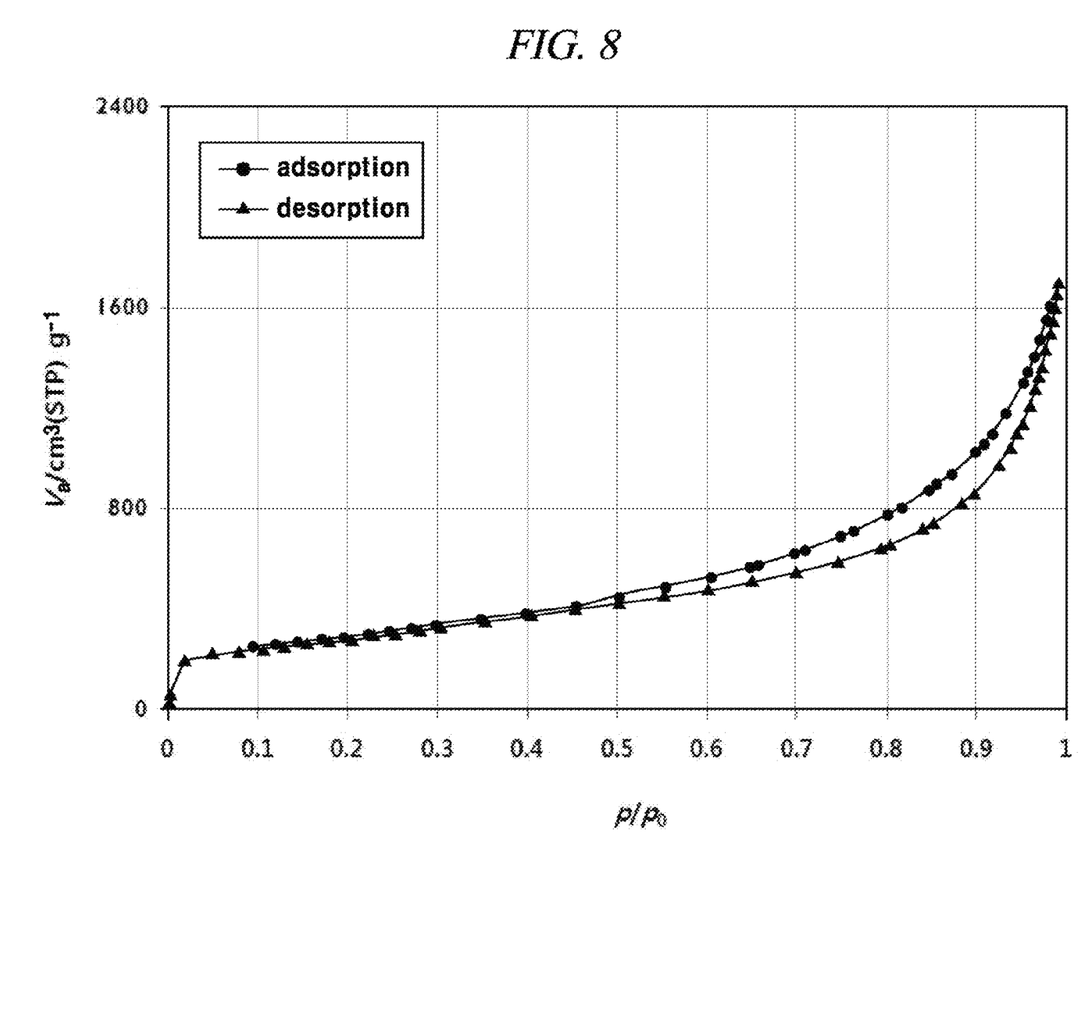
FIG. 8 is a diagram illustrating an example of adsorption/desorption isotherms of aggregated and nitrogen-doped graphene.

FIG. 7 is a diagram illustrating an example of a graph showing adsorption/desorption isotherms of the aggregated or crumpled graphene, and FIG. 8 is a diagram illustrating an example of a graph showing adsorption/desorption isotherms of the aggregated or crumpled and nitrogen-doped graphene.

TABLE 1

|  | Specific surface area ($m^2/g$) | Total pore volume ($cm^3/g$) | Average pore diameter (nm) |
| --- | --- | --- | --- |
| Example 3 | 1435.4 | 4.1062 | 11.443 |
| Example 4 | 1392.1 | 3.4708 | 9.9729 |
| Example 5 | 210.23 | 0.97 | 18.466 |
| Example 6 | 257.44 | 1.1795 | 18.326 |

As shown in Table 1, the aggregated or crumpled graphenes of Examples 3 and 4 exhibited high specific surface areas of 1435.4 $m^2/g$ and 1392.1 $m^2/g$, respectively. The aggregated or crumpled, nitrogen-doped graphenes of Examples 5 and 6 exhibited satisfactory specific surface areas of 210.23 $m^2/g$ and 257.44 $m^2/g$, respectively. The total pore volumes of the aggregated or crumpled graphenes obtained in Examples 3 and 4 were 4.1062 $cm^3/g$ and 3.4708 $cm^3/g$, respectively. The total pore volumes of the aggregated or crumpled and nitrogen-doped graphenes obtained in Examples 5 and 6 were 0.97 $cm^3/g$ and 1.1795 $cm^3/g$, respectively. This shows that all of the aggregated or crumpled graphene, the aggregated or crumpled graphene oxide, and the aggregated or crumpled, nitrogen-doped graphene in accordance with the above examples have excellent pore characteristic. As shown in Examples 3 to 6, it is confirmed that the aggregated or crumpled graphene, the aggregated or crumpled graphene oxide, and the aggregated or crumpled, nitrogen-doped graphene in accordance with the above examples are reproducibly prepared with superior productivity of approximately 40% or more.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

We claim:

1. A method of preparing aggregated graphene oxide, comprising:
dispersing graphene oxide in an organic solvent; and
adding an anti-solvent to the dispersed graphene oxide to form aggregated graphene oxide in the anti-solvent.

2. The method of claim 1, wherein the organic solvent is selected from the group consisting of ethanol, methanol, dichloromethane, dimethylformamide, and N-methyl pyrrolidone.

3. The method of claim 1, wherein the anti-solvent is selected from the group consisting of acetone, methanol, isopropylalcohol, pyridine, dichloromethane, xylan, petroleum ether, and hexane.

4. The method of claim 1, further comprising filtering the aggregated graphene oxide in the anti-solvent in response to the formation of the aggregated graphene oxide.

5. A method of preparing aggregated graphene, comprising:
dispersing graphene oxide in an organic solvent;
adding an anti-solvent to the dispersed graphene oxide to form aggregated graphene oxide in the anti-solvent; and
reducing the aggregated graphene oxide in the anti-solvent.

6. The method of claim 5, wherein the organic solvent is selected from the group consisting of ethanol, methanol, dichloromethane, dimethylformamide, and N-methyl pyrrolidone.

7. The method of claim 5, wherein the anti-solvent is selected from the group consisting of acetone, methanol, isopropylalcohol, pyridine, dichloromethane, xylan, petroleum ether, and hexane.

8. The method of claim 5, further comprising filtering the aggregated graphene oxide in the anti-solvent prior to the reducing the aggregated graphene oxide.

9. The method of claim 5, wherein the reducing the aggregated graphene oxide comprises heat treating the aggregated graphene oxide or chemically reducing the aggregated graphene oxide.

10. A method of preparing aggregated and nitrogen-doped graphene, comprising:
dispersing graphene oxide in an organic solvent;
adding an anti-solvent to the dispersed graphene oxide to form aggregated graphene oxide in the anti-solvent;
preparing aggregated and nitrogen-doped graphene oxide in the anti-solvent; and
reducing the aggregated and nitrogen-doped graphene oxide in the anti-solvent.

11. The method of claim 10, further comprising photo-reacting the aggregated graphene oxide in the anti-solvent with a cyanide-based compound, wherein the cyanide-based compound is selected from the group consisting of cyanamide, dimethylcyanamide, diethylcyanamide, hydrogen cyanide, acetonitrile, propionitrile, butyronitrile, and valeronitrile.

12. The method of claim 11, wherein the photo-reacting is carried out by ultraviolet (UV) radiation.

13. The method of claim 10, wherein the organic solvent is selected from the group consisting of ethanol, methanol, dichloromethane, dimethylformamide, and N-methyl pyrrolidone.

14. The method of claim 10, wherein the anti-solvent is selected from the group consisting of acetone, methanol, isopropylalcohol, pyridine, dichloromethane, xylan, petroleum ether, and hexane.

15. The method of claim 10, further comprising filtering the aggregated graphene oxide in the anti-solvent prior to the reducing the aggregated and nitrogen doped graphene oxide.

16. The method of claim 10, wherein the reducing the aggregated and nitrogen doped graphene oxide comprises heat treating the aggregated graphene oxide and nitrogen doped graphene oxide or chemically reducing the aggregated graphene oxide and nitrogen doped graphene oxide.

17. Aggregated and nitrogen-doped graphene, which is prepared according to the method of claim 10, in which nitrogen content is 10 wt % to 20 wt % of carbon content, and which has a specific surface area of 200 $m^2/g$ to 900 $m^2/g$.

18. The method of claim 11, further comprising reducing the aggregated and nitrogen doped graphene oxide in the anti-solvent, wherein the photo-reacting comprises photo-reacting the aggregated and nitrogen-doped graphene oxide in the anti-solvent using a cyanide-based compound.

\* \* \* \* \*